(12) United States Patent
Lawton, Jr.

(10) Patent No.: US 9,801,368 B2
(45) Date of Patent: Oct. 31, 2017

(54) DECOY DEVICE

(71) Applicant: Robert P Lawton, Jr., Smyrna, SC (US)

(72) Inventor: Robert P Lawton, Jr., Smyrna, SC (US)

( * ) Notice: Subject to any disclaimer, the term of this patent is extended or adjusted under 35 U.S.C. 154(b) by 141 days.

(21) Appl. No.: 14/571,548

(22) Filed: Dec. 16, 2014

(65) Prior Publication Data

US 2015/0173347 A1 Jun. 25, 2015

Related U.S. Application Data

(60) Provisional application No. 61/918,221, filed on Dec. 19, 2013.

(51) Int. Cl.
*A01M 31/06* (2006.01)

(52) U.S. Cl.
CPC .................................. *A01M 31/06* (2013.01)

(58) Field of Classification Search
CPC ...................................................... A01M 31/06
USPC ............................................................. 43/3, 2
See application file for complete search history.

(56) References Cited

U.S. PATENT DOCUMENTS

| | | | | |
|---|---|---|---|---|
| 368,427 A * | 8/1887 | Ryan | ...................... | A01M 31/06 43/3 |
| 575,283 A * | 1/1897 | Frantz | ................... | A01M 31/06 43/3 |
| 722,682 A * | 3/1903 | Dills | ..................... | A01M 31/06 43/3 |
| 735,314 A * | 8/1903 | Syms | .................... | A01M 31/06 43/3 |
| 775,545 A * | 11/1904 | Riggs | .................... | A01M 31/06 43/3 |
| 775,580 A * | 11/1904 | Riggs | .................... | A01M 31/06 43/3 |
| 1,062,713 A * | 5/1913 | Johnson | ................ | A01M 31/06 43/3 |
| 1,316,566 A * | 9/1919 | Fauble | .................. | A01M 31/06 43/3 |
| 1,486,329 A * | 3/1924 | George | ................. | A01M 31/06 43/3 |
| 1,923,442 A * | 8/1933 | Kilgore | ................ | A01M 31/06 43/3 |
| 2,023,526 A * | 12/1935 | Hoberg | ................ | A01M 31/06 43/3 |
| 2,237,897 A * | 4/1941 | Vos | ......................... | A63H 3/08 43/2 |
| 2,278,594 A * | 4/1942 | Smith | ................... | A01M 31/06 43/3 |
| 2,395,247 A * | 2/1946 | Buffenbarger | .......... | A63H 3/08 43/3 |

(Continued)

*Primary Examiner* — Darren W Ark
(74) *Attorney, Agent, or Firm* — P. Jeff Martin; The Law Firm of P. Jeffrey Martin, LLC

(57) ABSTRACT

A decoy device is constructed of a lightweight foam material formed as a planar decoy blank. The decoy body is easily foldable from a flat configuration to a buoyant three-dimensional decoy. The decoy body is releasably secured in the three-dimensional condition via an attachment means. A double-headed element is included having a male gender at one end and a female gender at an opposing end thereof. The body and double-headed element include opposing sides, each adorned with markings such that they resemble a particular wild game species, including gender, desired for exposed representation.

12 Claims, 20 Drawing Sheets

(56) References Cited

U.S. PATENT DOCUMENTS

| | | | | |
|---|---|---|---|---|
| 2,430,645 | A * | 11/1947 | Mills | A01M 31/06 43/3 |
| 2,441,753 | A * | 5/1948 | Carpenter | A01M 31/06 43/3 |
| 2,520,233 | A * | 8/1950 | Buehl | A01M 31/06 43/3 |
| 2,555,815 | A * | 6/1951 | Rawlins | A01M 31/06 43/3 |
| 2,630,093 | A * | 3/1953 | Toal | A01M 31/06 43/3 |
| 2,678,778 | A * | 5/1954 | Gibson | A01M 31/06 43/3 |
| 2,711,607 | A * | 6/1955 | Watson | A01M 31/06 43/3 |
| 2,783,572 | A * | 3/1957 | Rohan | A01M 31/06 43/3 |
| 2,929,165 | A * | 3/1960 | Rees | A01M 31/06 43/3 |
| 3,029,541 | A * | 4/1962 | Palmer | A01M 31/06 43/3 |
| 3,050,895 | A * | 8/1962 | Bratland | A01M 31/06 43/3 |
| 3,408,763 | A * | 11/1968 | Rudolph | A01M 31/06 43/3 |
| 3,492,751 | A * | 2/1970 | McInnes | A01M 31/06 43/3 |
| 4,172,335 | A * | 10/1979 | Farmer | A01M 31/06 43/3 |
| 4,251,937 | A * | 2/1981 | Curley | A01M 31/06 43/3 |
| 4,318,240 | A * | 3/1982 | Hillesland | A01M 31/06 43/3 |
| 4,475,674 | A * | 10/1984 | Farmer | A01M 31/06 43/3 |
| 4,753,028 | A * | 6/1988 | Farmer | A01M 31/06 43/3 |
| 4,928,418 | A * | 5/1990 | Stelly | A01M 31/06 43/3 |
| 4,972,620 | A | 11/1990 | Boler | |
| 5,003,718 | A * | 4/1991 | Lenert | A01M 31/06 43/3 |
| 5,003,722 | A * | 4/1991 | Berkley | A01M 31/06 43/3 |
| 5,168,650 | A * | 12/1992 | Martin | A01M 31/06 43/3 |
| 5,191,730 | A * | 3/1993 | Balmer | A01M 31/06 43/3 |
| 5,461,816 | A * | 10/1995 | Gazalski | A01M 31/06 43/3 |
| 5,682,702 | A * | 11/1997 | McKnight | A01M 31/06 43/3 |
| 6,082,036 | A * | 7/2000 | Cripe | A01M 31/06 43/3 |
| 6,216,382 | B1 | 4/2001 | Lindaman | |
| 6,381,896 | B1 | 5/2002 | Coker | |
| 6,470,620 | B1 * | 10/2002 | Acker | A01M 31/06 43/3 |
| 6,481,147 | B2 | 11/2002 | Lindaman | |
| 6,543,176 | B1 * | 4/2003 | McGhghy | A01M 31/06 43/3 |
| 6,560,912 | B1 * | 5/2003 | Achepohl | A01M 31/06 43/3 |
| 6,584,721 | B1 * | 7/2003 | Reule | A01M 31/06 43/3 |
| 6,857,216 | B1 * | 2/2005 | Merin | A01M 31/06 43/3 |
| 6,874,270 | B2 * | 4/2005 | Lorenz | A01M 31/06 43/3 |
| 7,117,628 | B1 * | 10/2006 | Bailey | A01M 31/06 43/3 |
| 7,337,575 | B2 * | 3/2008 | Hulley | A01M 31/06 43/3 |
| 7,389,606 | B2 * | 6/2008 | McLeod | A01M 31/06 43/2 |
| 7,409,793 | B1 * | 8/2008 | Schwarz | A01M 31/06 43/3 |
| 7,631,456 | B2 * | 12/2009 | Butz | A01M 31/06 43/3 |
| 7,730,656 | B2 * | 6/2010 | Hulley | A01M 31/06 43/3 |
| 8,082,689 | B2 * | 12/2011 | Eggleston | A01M 31/06 43/3 |
| 8,201,515 | B1 * | 6/2012 | Winter | A01M 31/06 114/294 |
| 8,793,922 | B2 * | 8/2014 | Roe | A01M 31/06 43/3 |
| 9,084,716 | B1 * | 7/2015 | Bawden | A01M 31/06 43/3 |
| 9,101,129 | B2 * | 8/2015 | Brooks | A01M 31/06 43/3 |
| 2002/0073598 | A1 * | 6/2002 | Wright | A01M 31/06 43/3 |
| 2009/0249678 | A1 * | 10/2009 | Arnold | A01M 31/06 43/2 |
| 2014/0144062 | A1 * | 5/2014 | Barley | A01M 31/06 43/2 |
| 2014/0230307 | A1 * | 8/2014 | Bartholomew | A01M 31/06 43/2 |

* cited by examiner

DECOY DEVICE

CROSS-REFERENCE TO RELATED APPLICATIONS

This application claims priority to U.S. Provisional Patent Application No. 61/918,221, filed on Dec. 19, 2013 and entitled, "Decoy Device". The entire contents of which are incorporated herein by reference.

BACKGROUND OF THE INVENTION

Field of the Invention

The present disclosure relates to hunting equipment and accessories, and more particularly to buoyant decoys for the attraction of wild fowl game.

Description of the Related Art

Many decoys are stationary, and, accordingly, lack lifelike motion. Game may be wary and may not approach a decoy that lacks flotation so that such decoys may be ineffective in attracting game. While various decoys may be available that include flotation, the flotation may be generally one-dimensional and therefore not sufficiently realistic to attract game.

A search of the patent arts did not disclose any references that read directly on the claims of the instant invention; however, the following references were considered related:

U.S. Pat. No. 4,318,240, issued in the name of Hillesland;
U.S. Pat. No. 6,381,896 B1, issued in the name of Coker;
U.S. Pat. No. 6,481,147 B2, issued in the name of Lindaman;
U.S. Pat. No. 7,631,456 B2, issued in the name of Butz;
U.S. Pat. No. 6,216,382 B1, issued in the name of Lindaman;
U.S. Pat. No. 7,389,606 B2, issued in the name of McLeod;
U.S. Pat. No. 4,972,620, issued in the name of Boler; and
U.S. Pat. No. 4,753,028, issued in the name of Farmer.

Accordingly, there is a need for an improved buoyant decoy apparatus, constructed of a lightweight material and configured to allow numerous decoys to be stacked on top of one another, thereby facilitating compact storage and transport of a high number of decoy devices in a single trip or transport event.

This application presents claims and embodiments that fulfill a need or needs not yet satisfied by the products, inventions and methods previously or presently available. In particular, the claims and embodiments disclosed herein describe a decoy device, the decoy device comprising: a lightweight, flexible body formed or die cut into a planar decoy blank, the body is foldable to a buoyant, three-dimensional configuration representing a wild game species; an attachment means for securely holding the body in the three-dimensional configuration; and a double-headed element releasably attachable to the body, the decoy device of the present invention providing unanticipated and nonobvious combination of features distinguished from the products, devices, apparatuses, inventions and methods preexisting in the art. The applicant is unaware of any product, device, method, disclosure or reference that discloses the features of the claims and embodiments disclosed herein.

BRIEF SUMMARY OF THE INVENTION

These and other needs and disadvantages may be overcome by the decoy device and related methods disclosed herein. Additional improvements and advantages may be recognized by those of ordinary skill in the art upon study of the present disclosure.

A floatable decoy device is disclosed, wherein the decoy device is constructed of a lightweight, flexible, cellular foam material. The decoy device includes a planar body formed as a planar decoy blank. The configuration of the blank allows for a plurality of decoy devices to be stacked for compact storage and transport. The decoy body is easily converted from a flat configuration to a three-dimensional decoy. The decoy body is releasably secured in the three-dimensional condition via an attachment means.

The decoy body has opposing side surfaces, and a two-headed elongated piece being releasably attachable to the body. The two-headed piece includes a male gender species at one end and a female gender species at the opposing end. The respective heads of the piece are disposed with species and gender specific markings and colors, and the side surfaces of the decoy body are disposed with species and gender specific markings and colors, thus allowing either side surface of the body, and two-headed piece, to be selectively exposable to resemble a particularly desired species and gender thereof.

In accordance to one embodiment of the present invention, a decoy device is disclosed for placement on land or a field. The decoy device comprises an anchor assembly.

In accordance to yet another embodiment of the present invention, a combination decoy and life preserver device is disclosed herein.

This summary is presented to provide a basic understanding of some aspects of the apparatus and methods disclosed herein as a prelude to the detailed description that follows below.

Accordingly, this summary is not intended to identify key elements of the apparatus and methods disclosed herein or to delineate the scope thereof.

BRIEF DESCRIPTION OF THE DRAWINGS

FIG. 14A is a bottom plan view a double-headed element to which a weight is interconnected thereto via a connecting link, in accordance to another embodiment of the present invention;

Figure 1:
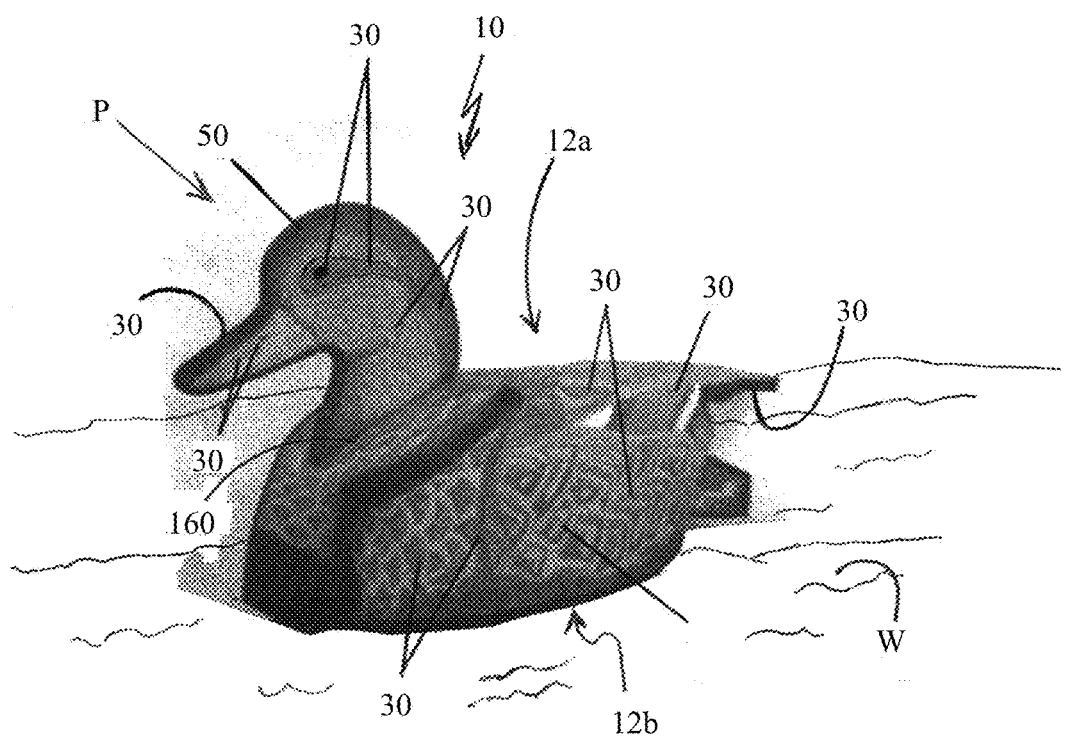
FIG. 1 is a perspective view of a decoy device shown folded in a releasably secured three-dimensional condition, in accordance to one embodiment of the present invention.
Figure 2:
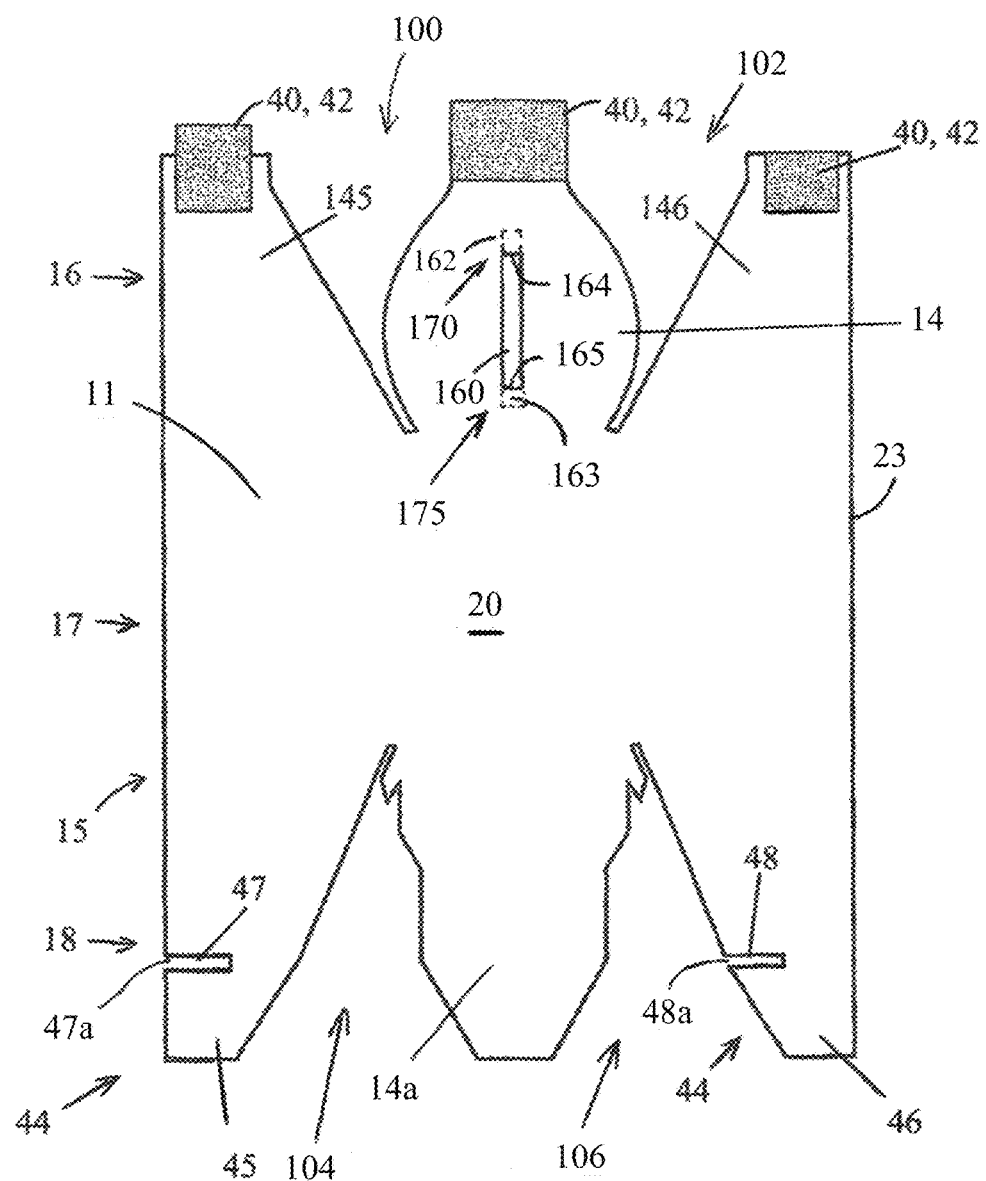
FIG. 2 is a top plan view of a decoy blank, in accordance to one embodiment of the present invention.
Figure 3:
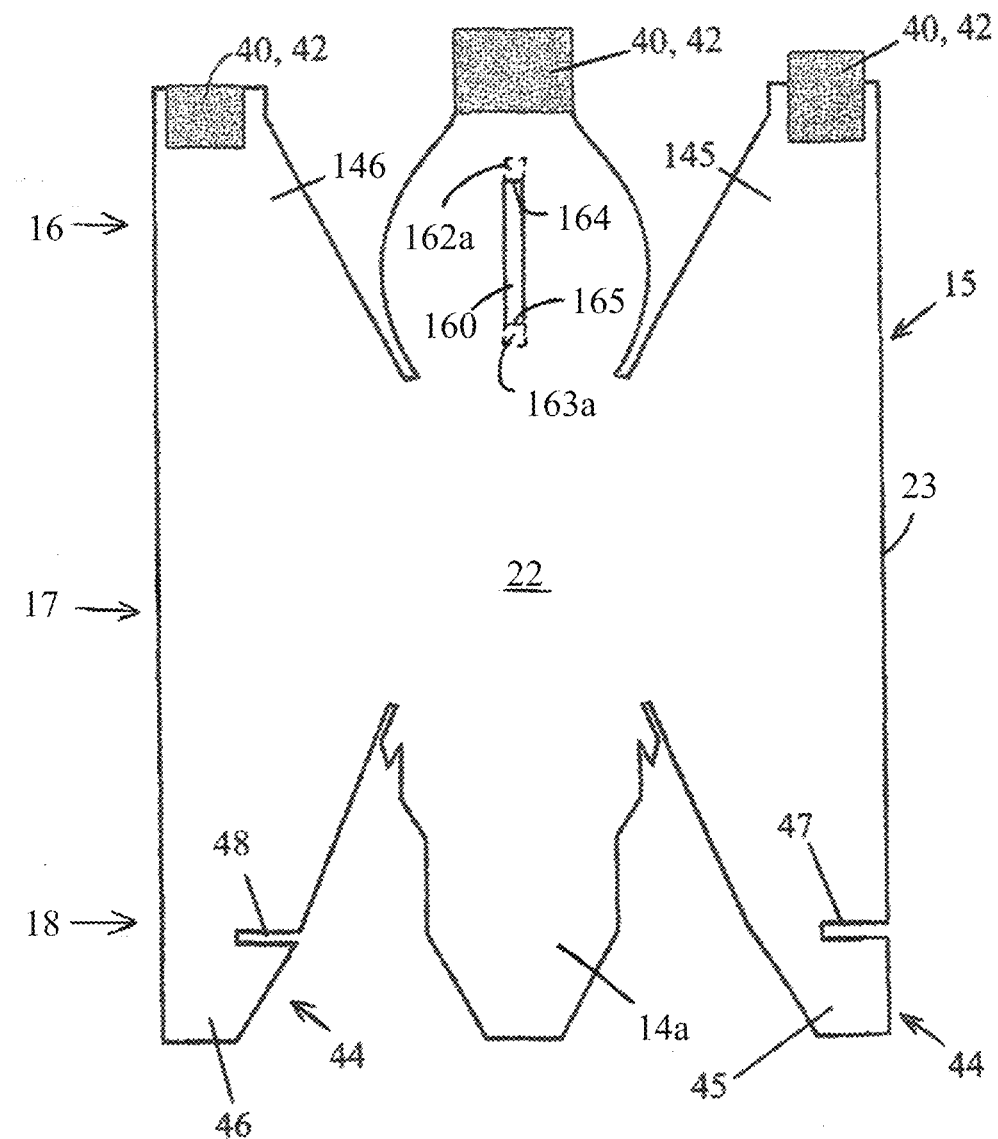
FIG. 3 is a bottom plan view of the decoy blank of FIG. 2.
Figure 3A:
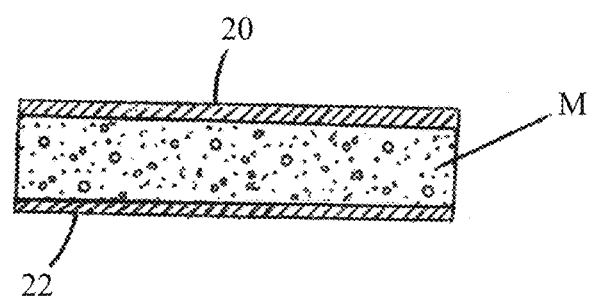
FIG. 3A is a cross-sectional view, on an enlarged scale, of the panel structure of FIGS. 2 and 3, in accordance to one embodiment of the present invention.
Figure 4:
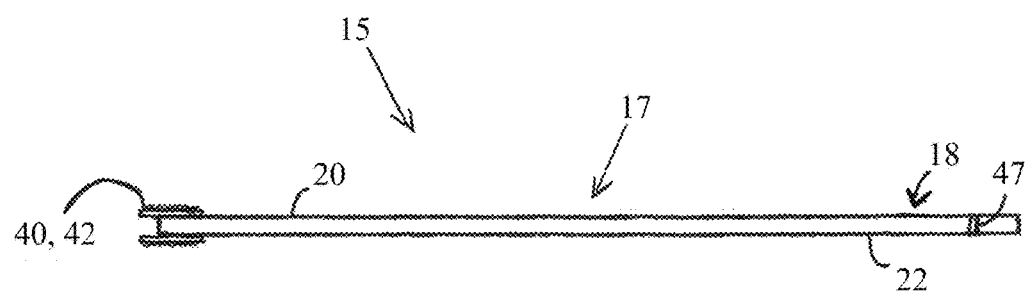
FIG. 4 is a side elevational view of a decoy blank, in accordance to one embodiment of the present invention.
Figure 5:
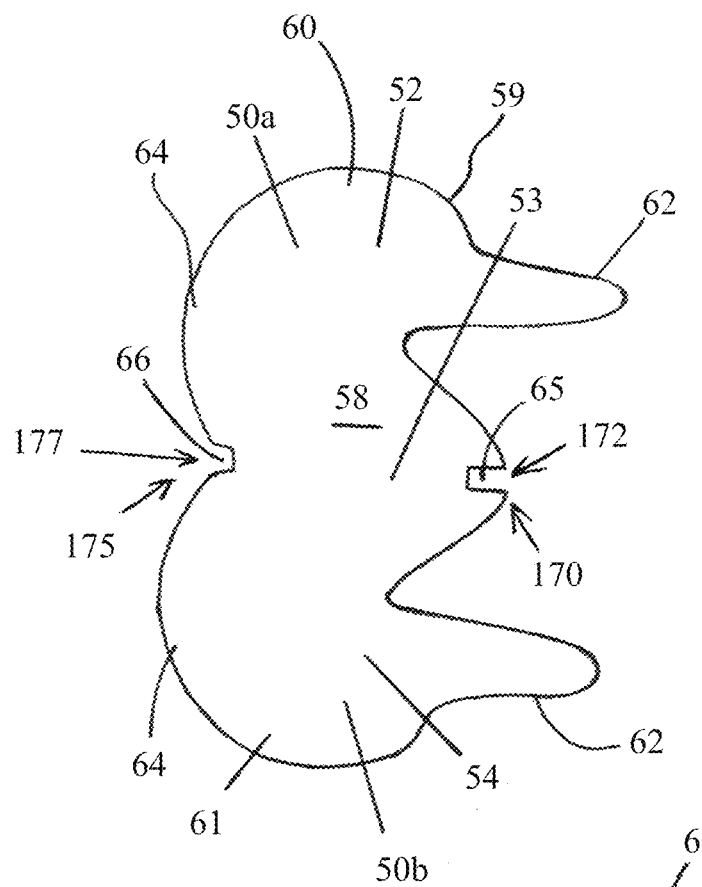
FIG. 5 is a bottom plan view of a double-headed element, in accordance to one embodiment of the present invention.

The figures are exemplary only, and the implementations illustrated therein are selected to facilitate explanation. The number, position, relationship and dimensions of the elements shown in the figures to form the various implementations described herein, as well as dimensions and dimensional proportions to conform to specific force, flexibility, weight, strength, flow and similar requirements are explained herein or are understandable to a person of ordinary skill in the art upon study of this disclosure. Where used in the various figures, the same numerals designate the same or similar elements. Furthermore, when the terms "top," "bottom," "right," "left," "forward," "rear," "first," "second," "inside," "outside," "interior", "outer", and similar terms are used, the terms should be understood in reference to the orientation of the implementations shown in the drawings and are utilized to facilitate description thereof.

DETAILED DESCRIPTION OF THE INVENTION

Referring now to FIGS. 1-8, a decoy device, generally designated at 10 is disclosed, in accordance to one embodiment of the present invention. The decoy device 10 comprises a lightweight, flexible panel 11 formed or die cut into a planar decoy blank 15, wherein the planar configuration of the blank 15 allows for a plurality of decoy devices 10 to be stacked for compact storage and transport. The blank 15 comprises an anterior section 16, a medial section 17, and a posterior section 18. The blank 15 further comprises a bulbous breast portion 14 in the anterior section 16, a tail portion 14a in the posterior section 18, the tail portion 14a being axially aligned with the breast portion 14, a pair of upper tabs 145 and 146, and a pair of lower tabs 45 and 46. The breast portion 14 is integrally formed intermediate to the pair of upper tabs 145 and 146. The pair of upper tabs 145 and 146 each extends integrally and tapers from the medial section 17, adjacent the breast portion 14 of the body 12, to the anterior section 16 of the blank 15. The first upper tab 145 and breast portion 14 are spaced by a first narrow V-shaped void 100, and the second upper tab 146 and breast portion 14 are spaced by a second narrow V-shaped void 102. The tail portion 14a is integrally formed intermediate to the pair of lower tabs 45 and 46. The pair of lower tabs 45 and 46 each extends integrally and tapers from the medial section 17 to the posterior section 18 of the blank 15. The first lower tab 45 and tail portion 14a are spaced by a first wide V-shaped void 104, and the second lower tab 46 and tail portion 14 are spaced by a second wide V-shaped void 106. The blank 15 is foldable into a body 12 comprising a three-dimensional configuration representing a wild game species, such as for example, a wood duck of the fowl species, or more specifically, waterfowl species. The body 12 includes a top 12a and a bottom 12b.

The blank 15 is constructed of a flexible, closed-cell expanded foam material M. The foam material selected for constructing the blank 15 is envisioned to be a polymer foam material which allows the body 12 to be buoyant. The polymer foam material may be selected from the group which includes, but is not limited to neoprene, closed-cell acrylonitrile butadiene rubber, and polyethylene, and may include polyethylene cross-linked by an irradiation process. The selected foam material is lightweight, returnably-resilient or otherwise comprises "memory", and impervious to weather conditions, such as water, and extreme temperatures.

The blank 15 further includes a top side 20 opposing a bottom side 22, and a continuous, peripheral upwardly-depending sidewall 23 integrally joining the top side 20 and the bottom side 22. The top side 20 is adorned with markings 30 and colors so as to represent a male wild game species (e.g., a fowl or bird species), and the bottom side 22 is adorned with markings 30 so as to represent a female wild game species (e.g., a fowl or bird species), and vice-versa. Thus, each side 20 and 22 is adorned with markings 30 such that they resemble the particular bird or fowl species, including gender, desired for visibly exposed representation. In accordance to one exemplary embodiment, the body 12 (blank 15) may be adorned with markings 30 which represent wild game waterfowl species which include, but are not limited to mallards, black ducks, mottled ducks, Mexican ducks, pintails, gadwalls, American wigeons, shovelers, wood ducks, green-winged teal, blue-winged teal, cinnamon teal, fulvous tree duck, black-bellied tree ducks, and American coots.

The outer surface of each side 20 and 22 may be configured so as to resemble the body of a game bird or game animal such as a duck, wild turkey, or Canada goose. Accordingly, the outer surface of the sides 20 and 22 may be contoured in various ways, painted, textured, disposed with an ornamental canvas, lined, dyed, painted, silk screen sprayed, woven, coated, layered with ornamental media, and so forth to lend the outer surface the desired appearance.

For purposes of this disclosure, the term "represent" and variations thereof is intended in a nonlimiting manner to mean "visually depict", "emulate", or otherwise "simulate"; thus, for example in the instance where a decoy body 12 (and a double-headed element 50 to be described later) is described as being shaped, configured, and disposed with ornamental markings and colors so as to represent a particular game species, including gender, such description is equally interpretable as meaning the decoy simulates a particular game species, including gender, three-dimensionally (i.e., a life-size, scale model of the game animal). In addition, while waterfowl are illustrated in the figures, other game species and animals are clearly envisioned and within the scope and spirit of the present application. For example, other game species and animals may include, but are not limited to, deer, antelope, coyote, turkey, hare, and fox.

The body 12 is foldable to a three-dimensional configuration representing a fowl species, and releasably secured in such configuration via an attachment device 40 or means such as including, but not limited to, a hook-and-loop fastening system 42 (Velcro®), an interengaging connection mechanism 44 or means, snap-fit mechanisms, mechanical interference or frictional fit connection systems, zippers, magnetic devices, adhesive strips with releasable liners, and other complementary type or matching connector devices and systems, and combinations thereof. In a folded condition, the body 12 includes a hollow interior 13. In accordance to one exemplary embodiment, a waterfowl is represented by the body 12 in FIG. 1.

In accordance to one embodiment, the interengaging means 44 releasably secures decoy blank 15 in a flexed, three-dimensional configuration, as illustrated in FIG. 1. The pair of lower tabs 45 and 46 extends integrally and tapers from the medial section 17 to the posterior section 18 of the blank 15. The pair of tabs 45 and 46 each includes a horizontally-oriented slit 47 and 48, respectively. The slit 47 of the first tab 45 defines an open end 47a which faces away from the tail portion 14a of the body 12, and the slit 48 of the second tab 46 defines an open end 48a which faces the tail portion 14a of the body 12. The tabs 45 and 46 are flexibly bent towards each other, the slits 47 and 48 are axially aligned and then interengaged so that the tabs 45 and 46 are mutually engaged via respective slits 47 and 48, thereby releasably securing the tabs 45 and 46 to one another in a frictional fit arrangement.

In accordance to one embodiment, the hook-and-loop fastening system 42 cooperates with interengaging means 44 for releasably securing decoy blank 15 in a flexed, three-dimensional configuration, as best illustrated in FIG. 1. The pair of upper tabs 145 and 146 each extends integrally and tapers from the medial section 17, adjacent the breast portion 14 of the body 12, to the anterior section 16 of the blank 15. Hook devices of the hook-and-loop fastening system 42 are suitably attached to the top side 20 of the free ends of the upper tabs 145 and 146, and loop devices of the hook-and-loop fastening system 42 are suitably attached to the bottom side 22 of the free ends of upper tabs 145 and 146 and to the top and bottom sides 20 and 22 of a free end of the breast portion of the body 12. It is within the contemplation of the present application that the hook devices may otherwise be attached to the bottom side 22 of tabs 145 and 146, and the loop devices attached to the top side 20 of tabs 145 and 146. The hook devices cooperate with the loop devices of the hook-and-loop fastening system 42 in an overlapping fashion to releasably secure tab 145 to tab 146. When the body 12 is released from its three-dimensional configuration, the returnably-resilient foam material used to construct the body 12 allows it to regain its flat, planar shape for quick, easy, and efficient stackable storage and transport.

In accordance to one embodiment, the decoy device 10 further comprises a double-headed element 50 defining a male gender 52 at one end 50a thereof and a female gender 54 at an opposing end 50b thereof. A neck 53 integrally connects the male gender 52 end 50a and the female gender 54 end 50b. The double-headed element 50 is defined as a one-piece unitary structure. The word "unitary", as used herein, is defined as a continuous, homogeneous mass. The double-headed element 50 is releasably held by the body 12 (holding function to be described later in greater detail). Each end 50a, 50b of the double-headed element 50 comprises a head portion 60, 61, a bill 62, and a downwardly-sloped crest 64. The double-headed element 50 further comprises a top side 56 opposing a bottom side 58, and a continuous, peripheral upwardly-depending sidewall 59 integrally joining the top side 56 and the bottom side 58. Each the top side 56 and bottom side 58 having an upper half section opposing a lower half section. A neck 53 joins the upper half section and lower half section. Double-headed element 50 still further comprises an inwardly-curved interface 63 contiguously adjoining the bill 62 and neck 53, the interface 63 being integrally formed by a portion of the continuous, peripheral upwardly-depending sidewall 59.

The upper half section of each the top side 56 and bottom side 58 of double-headed element 50 is adorned with markings 30 and colors so as to represent a male fowl or bird species, and the lower half section of the top side 56 and bottom side 58 is adorned with markings so as to represent a female fowl or bird species, and vice-versa, and the sections of the respective sides 56 and 58 correspond to and are consistent respectively with the selected species and gender side of the body 12 selected for exposure. Thus, each side 56 and 58 is adorned with markings such that they resemble the particular bird or fowl species, including gender, desired for visibly exposed representation, and which corresponds to and is consistent with the selected species and gender side of the body 12 selected for exposure. The outer surface of each side 56 and 58 may be configured such that the ends of the double-headed element 50 resemble the head and neck of a game bird or fowl, or game animal such as a duck, wild turkey, or Canada goose. Accordingly, the outer surface of the double-headed element 50 may be contoured in various ways, painted, textured, disposed with an ornamental canvas, lined, dyed, painted, silk screen sprayed, woven, coated, layered with ornamental media, and so forth to lend outer surface the desired appearance. In reference to FIG. 14, the head portion 60, 61 includes an oval void 60a, 61a, respectively, wherein each representing and providing a visually-perceptible eye, and each of which further functioning as a means for attaching an end of a tether 87 or line (to be described later in greater detail). Regarding FIG. 14A, and in accordance to another embodiment, the head portion 60, 61 is ornamented with markings 30 which includes an eye 60b, 61b, respectively, disposed thereon.

Referring now more particularly to FIGS. 1-6, and 7, in accordance to one embodiment, the double-headed element 50 comprises a first end 50a opposing a second end 50b, the first and second ends integrally joined by a neck 53. The first end 50a defines a head 60 being shaped, configured, and adorned with aesthetic and ornamental features, markings, colors, and the like so that the head 60 substantially resembles a particular wild game species. The second end 50b defines a head 61 being shaped, configured, and adorned with aesthetic and ornamental features, markings, colors, and the like so as to resemble the head of another type of, or otherwise different wild game species with respect to the species exemplified by the first end 50a. In accordance to one exemplary embodiment, one end 50a of the double-headed element 50 may comprise or otherwise resemble a wood duck, and the opposing end 50*b* of the double-headed element 50 may comprise or otherwise resemble a mallard duck.

Figure 6:
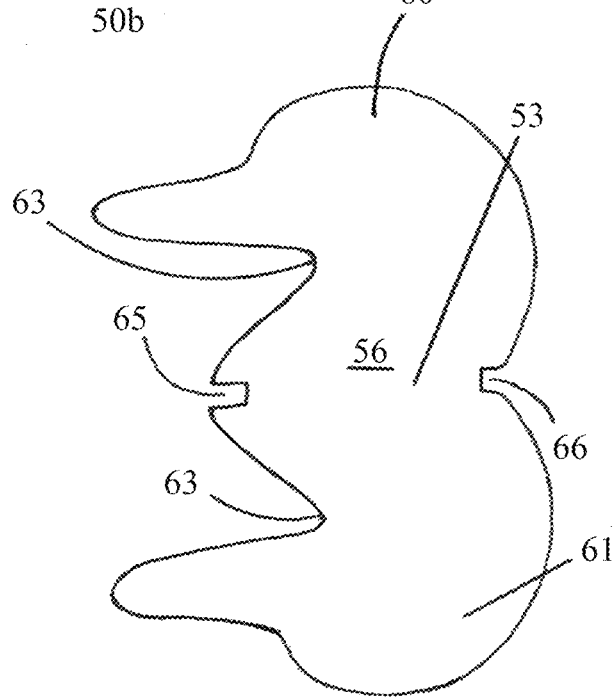
FIG. 6 is a top plan view of the double-headed element of FIG. 5.
Figure 6B:
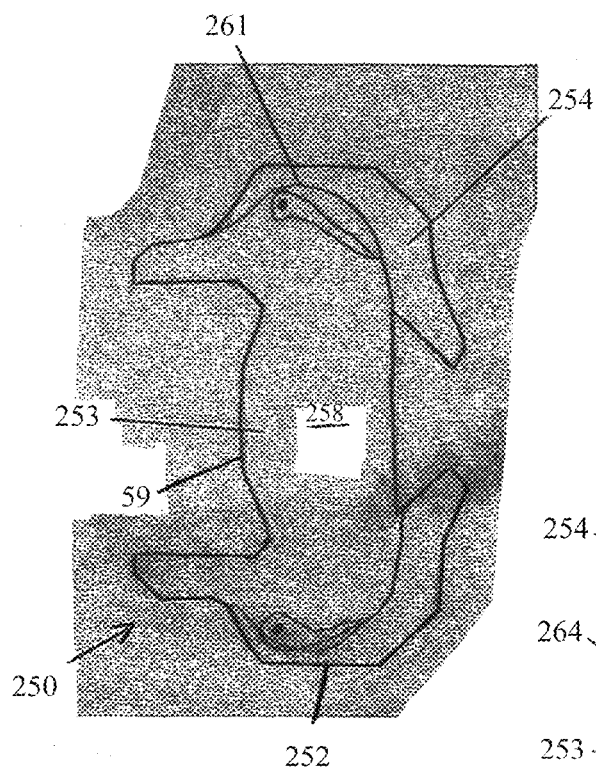
FIG. 6B is a bottom plan view of the double-headed element of FIG. 6A.
Figure 6A:
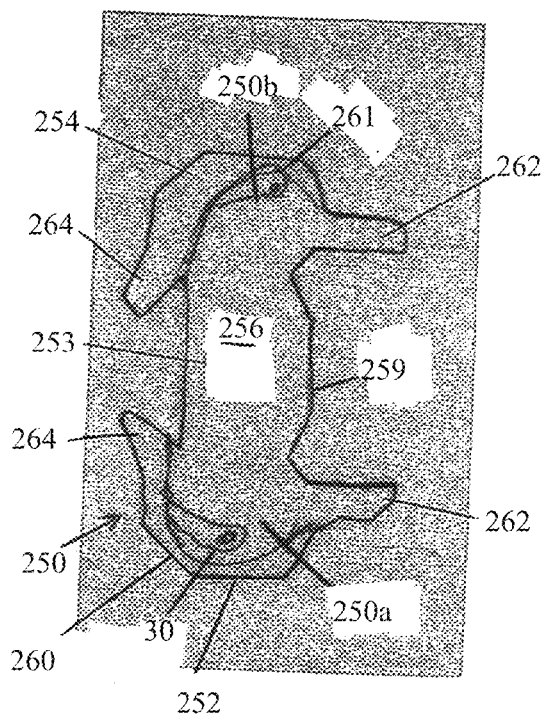
FIG. 6A is a top plan view of a double-headed element, in accordance to another embodiment of the present invention.
Figure 7:
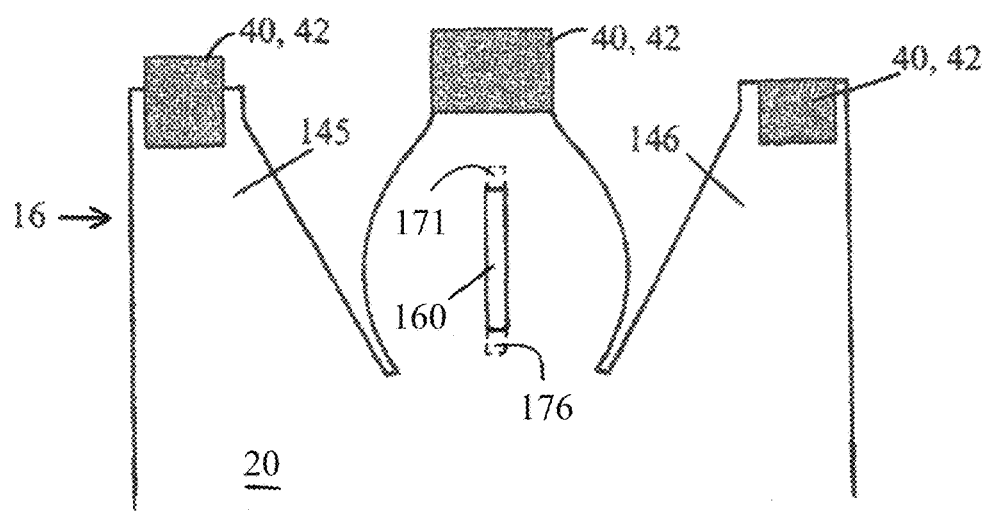
FIG. 7 is a partial top plan view of the anterior section of the decoy blank illustrating tongue portions of respective tongue-and-dado joints, in accordance to one embodiment of the present invention.

In reference to FIGS. 6A and 6B, an alternate double-headed element 250 embodiment is disclosed, wherein the double-headed element 250 defines a male gender 252 at one end 250*a* thereof and a female gender 254 at an opposing end 250*b* thereof. A neck 253 integrally connects the male gender 252 end 250*a* and the female gender 254 end 250*b*. The double-headed element 250 is defined as a one-piece unitary structure. The double-headed element 250 is releasably held by the body 12. Each end 250*a*, 250*b* of the double-headed element 250 comprises a head portion 260, 261 a bill 262, and a downwardly-depending crest 264. The double-headed element 250 further comprises a top side 256 opposing a bottom side 258, and a continuous, peripheral upwardly-depending sidewall 259 integrally joining the top side 256 and the bottom side 258. The top side 256 is adorned with markings 30 and colors so as to represent a male fowl or bird species, and the bottom side 258 is adorned with markings 30 so as to represent a female fowl or bird species, and vice-versa, and the sides 256 and 258 correspond to and are consistent respectively with the selected species and gender side of the body 12 selected for exposure. Thus, each side 256 and 258 is adorned with markings 30 such that they resemble the particular bird or fowl species, including gender, desired for visibly exposed representation, and which corresponds to and is consistent with the selected species and gender side of the body 12 selected for exposure. The outer surface of each side 256 and 258 may be configured such that the ends of the double-headed element 250 resemble the head and neck of a game bird or fowl, or game animal such as a duck, wild turkey, or Canada goose. Accordingly, the outer surface of the double-headed element 250 may be contoured in various ways, painted, textured, disposed with an ornamental canvas, lined, dyed, painted, silk screen sprayed, woven, coated, layered with ornamental media, and so forth to lend outer surface the desired appearance.

Referring now more particularly to FIGS. 2, 3, and 5-7, in order to releasably secure the double-headed element 50 to the body 12, an elongated vertically-oriented slit 160 is defined through the anterior section 16 of the body 12. The slit 160 includes a forward, upper surface mouth portion 162, a forward, lower surface mouth portion 162*a*, and a first vertical wall 164 integrally joining the forward, upper surface mouth portion 162 and forward, lower surface mouth portion 162*a* at one end of slit 160. The forward, upper surface mouth portion 162 and the forward, lower surface mouth portion 162*a* are defined by the respective areas inside the dashed lines. Mouth portions 162, 162*a* and first vertical wall 164 conjunctively form a tongue portion 171 of at least one tongue-and-dado joint 170 (to be described later in greater detail).

The slit 160 further includes a rear, upper surface mouth portion 163, a rear, lower surface mouth portion 163*a*, and a second vertical wall 165 integrally joining the rear, upper surface mouth portion 163 and rear, lower surface mouth portion 163*a* at an opposing end of slit 160. The rear, upper surface mouth portion 163 and the rear, lower surface mouth portion 163*a* are defined by the respective areas inside the dashed lines. Mouth portions 163, 163*a* and second vertical wall 165 conjunctively form a second tongue portion 176 of a second tongue-and-dado joint 175 (to be described later in greater detail).

One end of the double-headed element 50 is inserted through the slit 160 leaving the desired gender end visually exposed in a generally upright condition. The slit 160 is sized as to provide a snug, slightly compressed fit by the neck 53 when inserted therethrough, and thus releasably holds the double-headed element 50 via mechanical interference and impingement.

In order to prevent unintended or inadvertent withdrawal of the double-headed element 50 from the slit 160 during operation of the present invention, at least one tongue-and-dado joint 170 is disclosed. Two tongue-and-dado joints 170 and 175 are shown and described herein; however, more than two such joints 170, 175 may be utilized, and therefore envisioned. Hence, the use of more than two tongue-and-dado joints 170 are within the spirit and scope of the present application.

As previously described, the first tongue portion 171 of the first tongue-and-dado joint 170 comprises the forward, upper surface mouth portion 162, the forward, lower surface mouth portion 162*a*, and the first vertical wall 164 at one end of slit 160. The second tongue portion 176 of the second tongue-and-dado joint 175, as previously described, comprises the rear, upper surface mouth portion 163, the rear, lower surface mouth portion 163*a*, and the second vertical wall 165 at the opposing end of slit 160.

The dado portion 172 of the first tongue-and-dado joint 170 is formed by a first horizontally-oriented slot 65 formed integrally in the neck 53 of double-headed element 50. The first slot 65 is positioned between the opposing bills 62 of double-headed element 50. The dado portion 177 of the second tongue-and-dado joint 175 is formed by a second horizontally-oriented slot 66 formed integrally in the neck 53 of double-headed element 50, the second horizontally-oriented slot 66 opposing the first horizontally-oriented slot 65. The second slot 66 is positioned between the downwardly-sloped crests 64.

As one end of the double-headed element 50 is inserted through the slit 160, leaving the desired gender end visually exposed in a generally upright condition, the first tongue portion 171 of the first tongue-and-dado joint 170 engages the dado portion 172 of the first tongue-and-dado joint 170 in a sliding, friction-interferential, mating fashion, and releasably secures the first tongue portion 171 to the dado portion 172 in a frictional fit arrangement. The second tongue portion 176 of the second tongue-and-dado joint 175 engages the dado portion 177 of the second tongue-and-dado joint 175 in a sliding, friction-interferential, mating fashion, and releasably secures the second tongue portion 176 to the dado portion 177 of the second tongue-and-dado joint 175 in a frictional fit arrangement, and thus secures the double-headed element 50 to the body 12 of the decoy device 10 in a releasably secured manner.

Referring now to FIGS. 2, 3, 6A and 6B, to prevent unintended or inadvertent upward withdrawal of the double-headed element 250 from the slit 160, bottom edges of each the bill 262 and crest 264 of the end of the double-headed element 250 now positioned in the hollow interior of the body 12, engage against an underside of the mouth of the slit 160 in an abutting fashion, thereby preventing further upward movement of double-headed element 250. Likewise, to prevent unintended or inadvertent downward withdrawal of the double-headed element 250 from the slit 160, bottom edges of each the bill 262 and crest 264 of the desired visually exposed gender end 250*a* or 250*b*, engage against an upper side of the mouth of the slit 160 in an abutting fashion, thereby preventing further downward movement of double-headed element 250.

Referring now more particularly to FIGS. 1, 5, 6, and 12-14A, a means for stabilizing the decoy device 10 in a floating, upright position on the surface of a body of water W is disclosed. For purposes of this disclosure, the term "stabilize", and variations thereof, means to maintain equilibrium or resume an original, floating upright position after displacement caused by, for example, strong winds. In FIG. 1, the decoy device 10 is illustrated in the floating, upright position, hereinafter referred to as the "decoy stabilized position P".

The means for stabilizing the decoy device 10 in a floating upright position 70 comprises a connecting link 85 and a weight 80, wherein the connecting link 85 interconnects the weight 80 to the decoy device 10. The connecting link 85 comprises a length of tether 87 or line, such as a length of fishing line. The weight 80 may comprise a weight measure in the range of approximately between 0.25 ounces (oz.) to approximately 2.0 pounds. However, weights 80 of lighter and heavier weight measures are envisioned, as the required weight measure being dependent upon and relative to external forces (e.g., wind) envisioned to be applied against decoy device 10 during operation of the present invention. In accordance to one exemplary embodiment where the body 12 of the decoy device 10 represents a wood duck (excluding uncommon weather and atmospheric conditions occurring in a particular geographic region chosen to operate the present invention), the weight 80 comprises a weight measure preferably in the range of approximately 1.00 oz. to approximately 8.00 oz., and most preferably approximately 2.00 oz.

Figure 13:
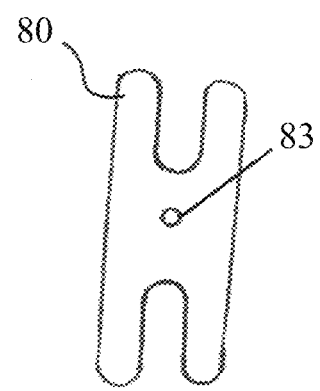
FIG. 13 is a top plan view of an alternative weight, in accordance to one embodiment of the present invention.

In addition, the weight 80 may comprise a number of various geometric shapes, including but not limited to circular (shown in FIG. 12) and prolate, as well as various symbols and characters, such as H-shaped (shown in FIG. 13). The weight 80 further includes a connecting eyelet 82 affixed thereto or a connecting aperture 83 bored therethrough.

Figure 14:
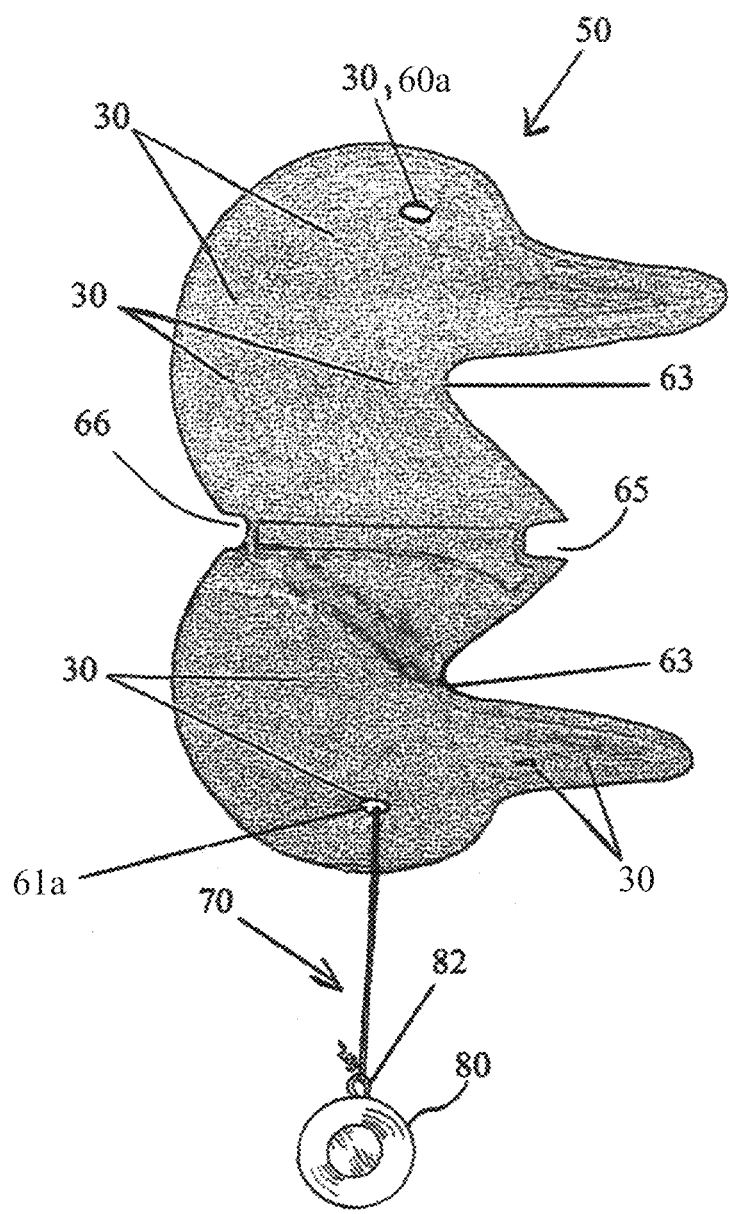
FIG. 14 is a bottom plan view of a double-headed element to which a weight is interconnected thereto via a connecting link, in accordance to one embodiment of the present invention.
Figure 14:
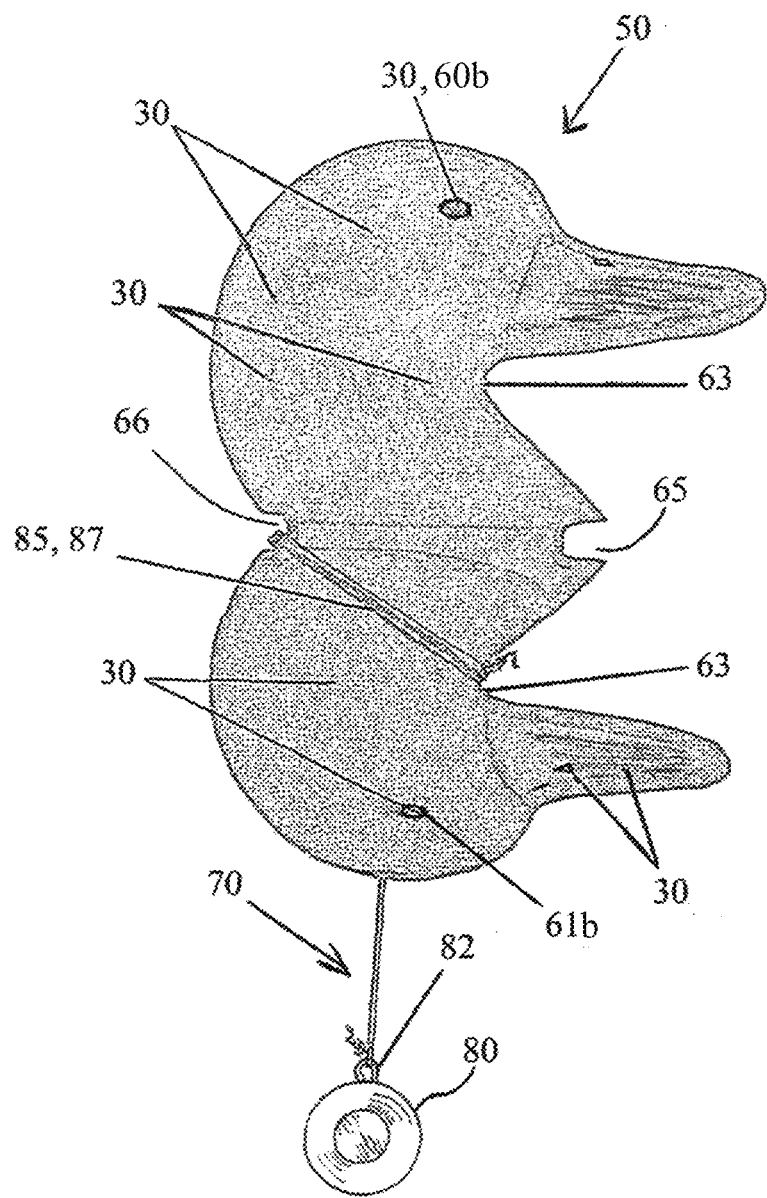

Referring now more particularly to FIG. 14, after releasably securing the double-headed element 50 to the body 12 as previously described, one end of the tether 87 is fixedly connected to the connecting eyelet 82 (or connecting aperture 83) of the weight 80, such as via knotting. The opposing or free end of tether 87 is fixedly connected to the attachment means 60b or 61b of double-headed element 50. Specifically, the opposing end of tether 87 is passed through the oval void 60b or 61b representing an eye, and thereafter knotted in a manner so as to securely attach the opposing end of tether 87 to the end 50a or 50b of the double-headed element 50 (such as the end 50a or 50b as would be currently positioned in the hollow interior of the body 12). The free end of tether 87 or line may be attached to the double-headed element 50 prior to securing said element 50 to the body 12.

Referring now more particularly to FIG. 14A, after releasably securing the double-headed element 50 to the body 12 as previously described, one end of the tether 87 is fixedly connected to the connecting eyelet 82 (or connecting aperture 83) of the weight 80, such as via knotting. The opposing or free end of tether 87 is looped around at least one of the following pairs of elements of the end 50a or 50b of the double-headed element 50 positioned in the hollow interior of the body 12: 1) the first horizontally-oriented slot 65 and second horizontally-oriented slot 66; and 2) the second horizontally-oriented slot 66 and the inwardly-curved interface 63, and the free end of tether 87 is fixedly connected therearound (e.g., such as via knotting), thereby connecting the weight 80 to the decoy device 10. The free end of tether 87 or line may be attached to the double-headed element 50 prior to securing said element 50 to the body 12. In such event, the selected tether 87 or line comprises a denier, filament, or gauge measure (or otherwise is not excessively looped and re-looped around element 50) which consumes a very small portion of the spatial volume provided by each the first and second horizontally-oriented slots 65 and 66. Otherwise, a tether 87 or line having a substantial denier, filament, or gauge measure may prevent or significantly limit or impair the ability of the tongue-and-dado joint 170 to facilitate releasably-secured attachment of double-headed element 50 to the body 12 in a frictional fit arrangement.

Referring now to FIGS. 8-13, in accordance to one embodiment, the means for stabilizing the decoy device 10 in a floating upright position 70 comprises an elongated, generally rectangular-shaped sleeve 71 having open opposed ends 72, 74 and an open interior 75. The sleeve 71 may be constructed of the same polymer foam material used to construct blank 15. Alternatively, the sleeve 71 may be constructed of a compressible material capable of being crimped using a suitable crimping tool (not shown) so as to allow the sleeve 71 to frictionally engage a weight 80 inserted within the interior 75 of sleeve 71, and thereby coupling the weight 80 in the interior 75 of sleeve 71.

Figure 9:
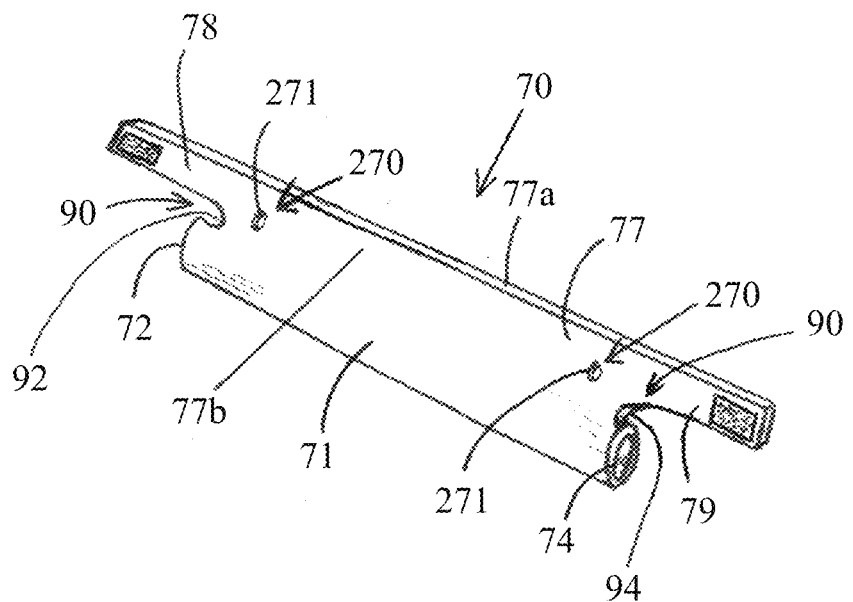
FIG. 9 is a left rear perspective view of a stabilizer, in accordance to one embodiment of the present invention.
Figure 10:
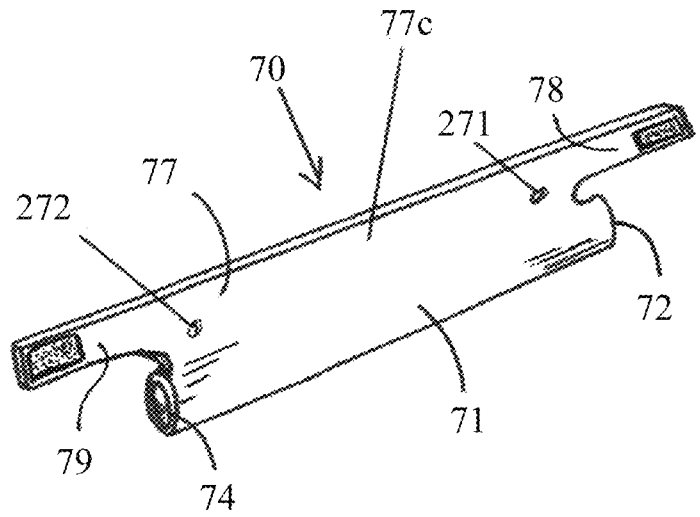
FIG. 10 is a right rear perspective of the stabilizer of FIG. 9.
Figure 11:
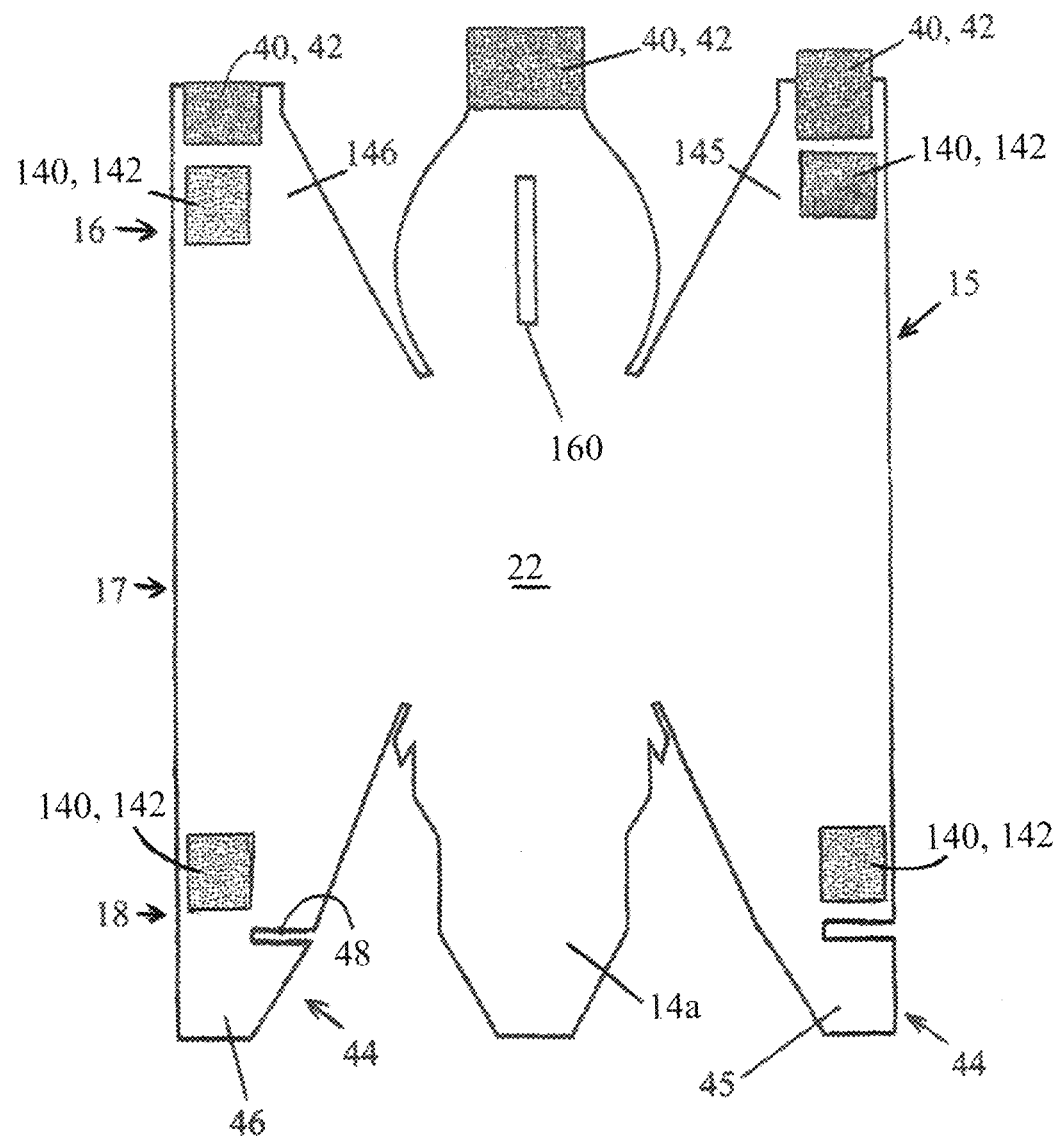
FIG. 11 is a bottom plan view of a decoy blank illustrating a fastening mechanism for detachably securing the stabilizer thereto, in accordance to one embodiment of the present invention.
Figure 12:
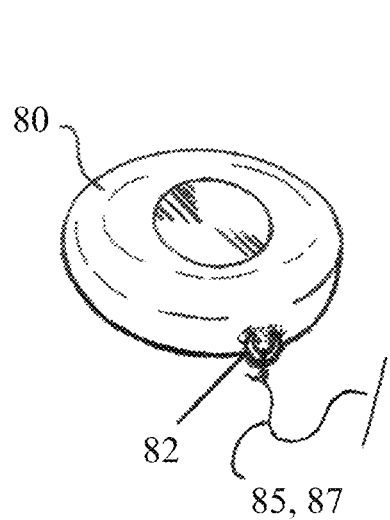
FIG. 12 is a perspective view of a weight, in accordance to one embodiment of the present invention.

The sleeve 71 further comprises a linearly-elongated arm 77 molded integral thereto about an upper circumferential surface thereof. The arm 77 comprises a generally rectangular configuration having an upper wall 77a, a left side wall 77b, and a right side wall 77c. The arm 77 extends parallel to sleeve 71. The arm 77 defines a greater length than sleeve 71 and has opposed ends 78, 79 each extending a greater length or otherwise protruding laterally a greater distance than the open opposed ends 72, 74, respectively, of sleeve 71, as best illustrated in FIGS. 9 and 10.

The sleeve 71 may be detachably secured to the bottom 12b of the body 12 of the decoy device 10, proximate a center thereof, via a fastening mechanism 140 selected from the group which includes, but is not limited to, a hook-and-loop fastening system 142 (Velcro®), and snap-fit mechanisms, mechanical interference or frictional fit connection systems, zippers, magnetic devices, adhesive strips with releasable liners, and other complementary type or matching connector devices and systems, and combinations thereof.

In accordance with one embodiment, the fastening mechanism 140 comprises a hook-and-loop fastening system 142, wherein a first set of hook devices thereof is suitably attached to one sidewall 77b or 77c at one end 78 or 79 of the arm 77, and a second set of hook devices is suitably attached to the opposite sidewall 77b or 77c at the end 78 or 79 opposing the first set of hook devices. More specifically, for example, the first set of hook devices may be suitably attached to the left sidewall 77b of arm 77 at end 78 thereof, and the second set of hook devices may be suitably attached to the right sidewall 77b of arm 77 at end 79 thereof. By way of another example, the first set of hook devices may be suitably attached to the left sidewall 77b of arm 77 at end 79 thereof, and the second set of hook devices may be suitably attached to the right sidewall 77b of arm 77 at end 78 thereof.

A first set of loop devices of the hook-and-loop fastening system 142 is suitably attached to the bottom side 22 to one of the upper tabs 145 or 146, below the attachment means 40 of the body 12. A second set of loop devices of the hook-and-loop fastening system 142 is suitably attached to the bottom side 22 to one of the lower tabs 45 or 46 being diagonal to the upper tab 145 or 146 comprising the first set of loop devices of the hook-and-loop fastening system 142. By way of example, the first set of loop devices of the hook-and-loop fastening system 142 may be suitably attached to the bottom side 22 to upper tab 145, and the second set of loop devices of the hook-and-loop fastening system 142 may be suitably attached to bottom side 22 to the lower tab 46. By way of another example, the first set of loop devices of the hook-and-loop fastening system 142 may be suitably attached to the bottom side 22 to upper tab 146, and the second set of loop devices of the hook-and-loop fastening system 142 may be suitably attached to the bottom side 22 to lower tab 45.

The first and second set of hook devices attached to the arm 77 of sleeve 71 cooperate with the corresponding first and second set of loop devices attached to the bottom side 22 of the blank 15 of decoy device 10 in an overlapping fashion to releasably secure the stabilizer 70 thereto.

As previously described, the first and second set of hook devices and the first and second set of loop devices of the hook-and-loop fastening system 142 may be attached, respectively, to the arm 77 of stabilizer 70 and to tabs 145, 146 and 45, 46. It is within the contemplation of the present application that the first and second set of hook devices and the first and second set of loop devices of the hook-and-loop fastening system 142 may be attached to the arm 77 and tabs 145, 146 and 45, 46 in a vice-versa manner.

In accordance to another embodiment, it is envisioned that one end 78 or 79 of one side wall 77b or 77c may be suitably attached (such as via stitching) to one upper tab 145 or 146. The unattached end 78 or 79 and one of the upper tabs 145 or 146 and one of the lower tabs 45 or 46 include complementary hook or loop material, respectively, for achieving releasably securement of the unattached end 78 or 79 of stabilizer 70 to the blank 15 of the decoy device 10.

It is further envisioned that the blank 15 may include a base panel or portion to which the stabilizer 70 is detachably secured, wherein the base being integrally molded to the blank 15 during the blank 15 molding process, or suitably attached to blank 15 or otherwise releasably attached thereto via a suitable coupling mechanism.

Figure 8:
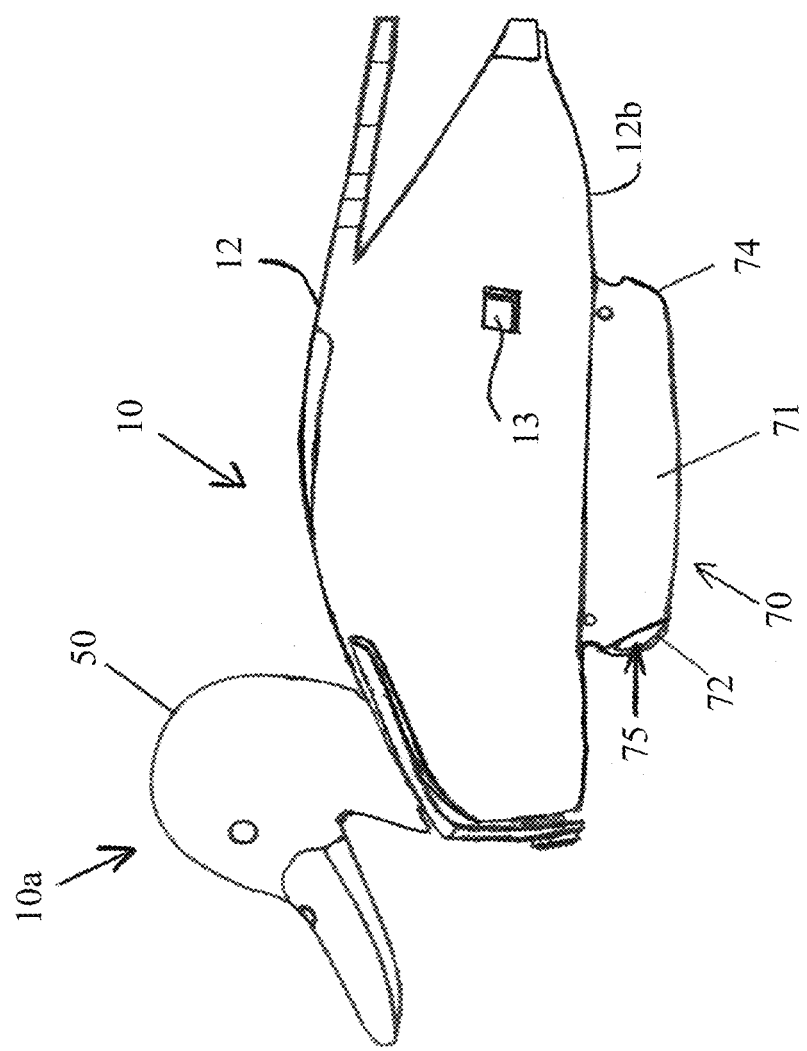
FIG. 8 is a left side elevational view of a decoy device illustrating a stabilizer thereof, in accordance to one embodiment of the present invention.

Referring now to FIGS. 8-10, the sleeve 71 further comprises one or more holes 270, wherein two spatially-aligned holes 271 and 272 are disclosed, in accordance to one embodiment.

The open interior 75 of sleeve 71 is configured for snugly receiving a weight 80. The weight 80 is inserted through either end 78 or 79 of sleeve 71 and pushed into the interior 75 thereof. The weight 80 defines an area, or more specifically, defines a size and configuration so as to be snugly received within the open interior 75 of sleeve 71. The connecting link 85, shown herein as a tether 87, interconnects the weight 80 to the decoy device 10 via the stabilizer 70. One end of tether 87 is fixedly connected to connecting eyelet 82 (or connecting aperture 83) of the weight 80. The opposing or free end of tether 87 is threaded through the one or more holes 270 of the arm 77 of sleeve 71 and attached thereto, such as via knotting, thereby connecting the weight 80 to the decoy device 10. Prior to positioning weight 80 into the interior 75 of sleeve 71, excess tether 87 length is looped around the pair of distally-opposed incurvate recesses 92 and 94, leaving a suitable length of tether 87 to allow the weight 80 to be inserted into the interior 75 of sleeve 71.

After connecting the weight 80 to the decoy device 10, the weight 80 underlies the body 12 of the decoy device 10, generally about a center thereof. In accordance to one embodiment, during operation of the present invention, the decoy device 10 is positioned in a floating, upright position on the surface of a body of water W, or decoy stabilized position P (as best illustrated in FIG. 1). In the event a physical force in the form of, e.g., wind and/or a waves is applied to the device 10 causing said device 10 to topple, roll, or bobble forward, rearward, laterally, and any combination thereof, the weight 80 supplies a counteracting force which forces decoy device 10 to return to the decoy stabilized position P. The counteracting force supplied by the weight 80 is a downward force due to the gravitational attraction of the Earth. Thus, when the decoy device 10 is oriented in the decoy stabilized position P on the surface of a body of water W, the counteracting force supplied by the weight 80 is constant. Therefore, when using the decoy device 10, the stabilizer 70 further functions to maintain decoy device 10 in the decoy stabilized position P.

A means for selectively-adjusting the depth at which the weight 80 extends downwardly from the stabilizer 70 into the water W is disclosed. The depth adjustment means 90 comprises a pair of distally-opposed incurvate recesses 92 and 94. The first incurvate recess 92 is integrally formed between the first open end 72 of sleeve 71 and the first end 78 of arm 77. The second incurvate recess 94 is integrally formed between the second open end 74 of sleeve 71 and the second end 79 of arm 77.

Excess tether 87 may be looped around the opposed incurvate recesses 92 and 94, thereby allowing the user to adjust the longitudinal length of the tether 87 as it hangs in a suspended manner downward from the stabilizer 70 (or double-headed element 50), and hence adjust the depth at which tether 87 hangs therefrom, or from the double-headed element 50 into the water W. In any event, the connecting link 85 comprises a length appropriate for the depth of the body of water W upon which the decoy device 10 is to be utilized. Referring now more particularly to FIGS. 8-10, and 12-14, depth adjustment means 90 also functions to provide a decoy anchor 110.

Figure 15:
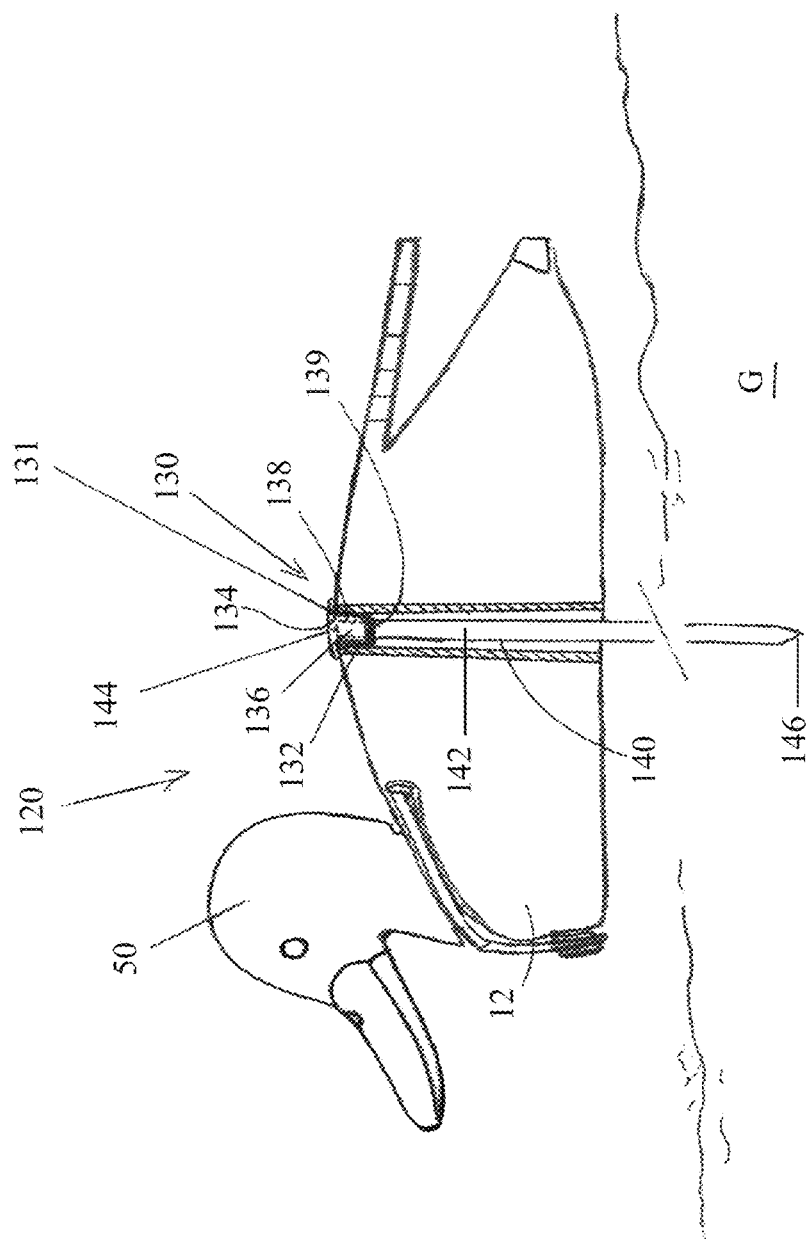
FIG. 15 is a partial cross-sectional view of a decoy device, in accordance to an alternate embodiment of the present invention.
Figure 16:
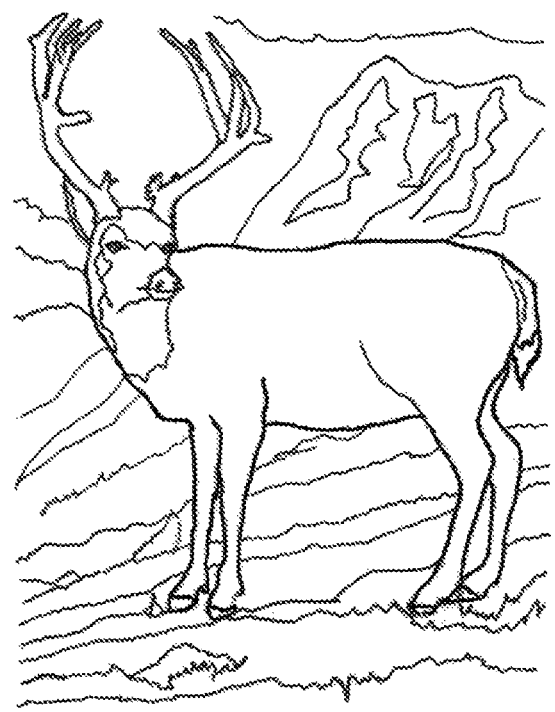
FIG. 16 is a perspective view of a representative wild game species depicting a deer.
Figure 16A:
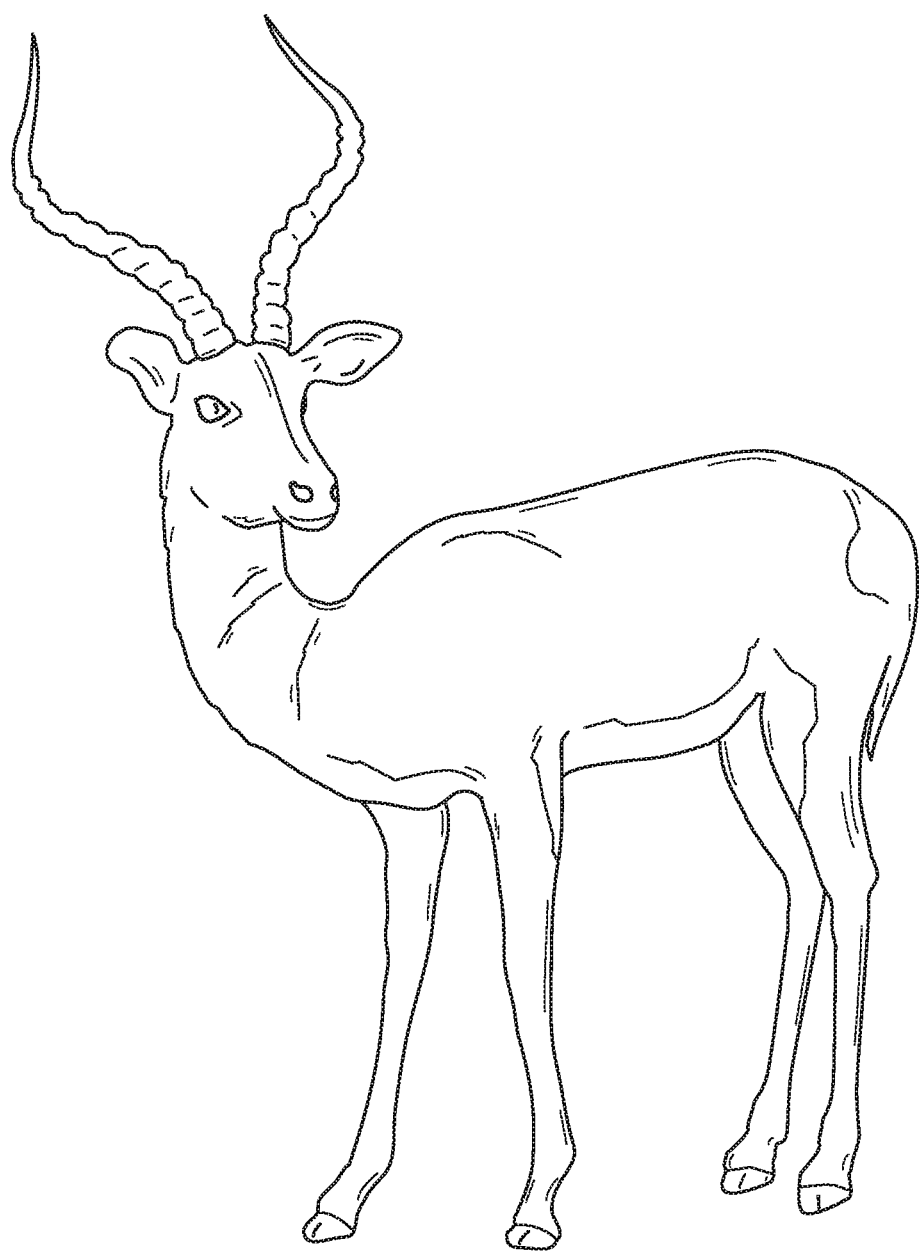
FIG. 16A is a perspective view of a representative wild game species depicting an antelope.
Figure 16B:
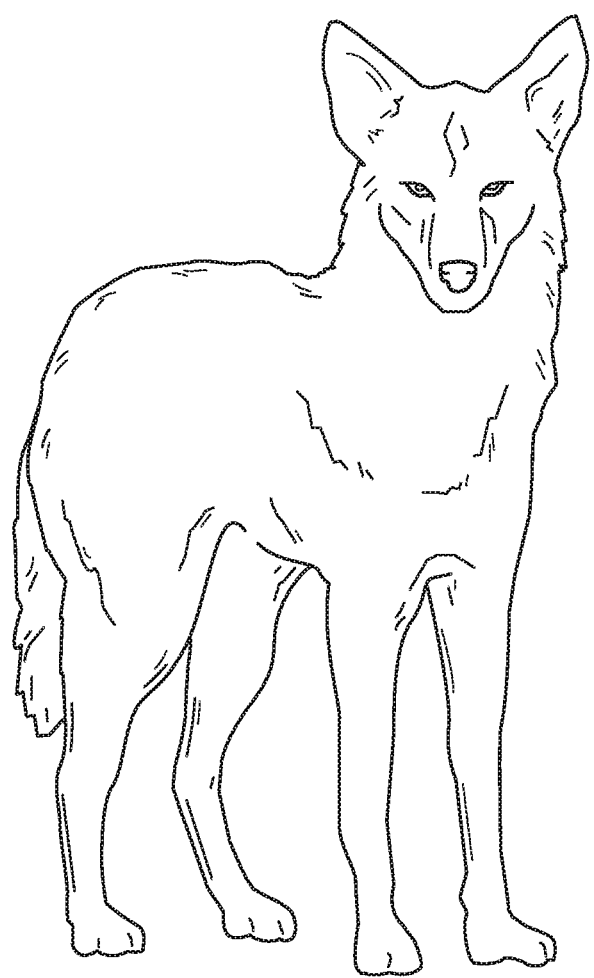
FIG. 16B is a perspective view of a representative wild game species depicting a coyote.
Figure 16C:
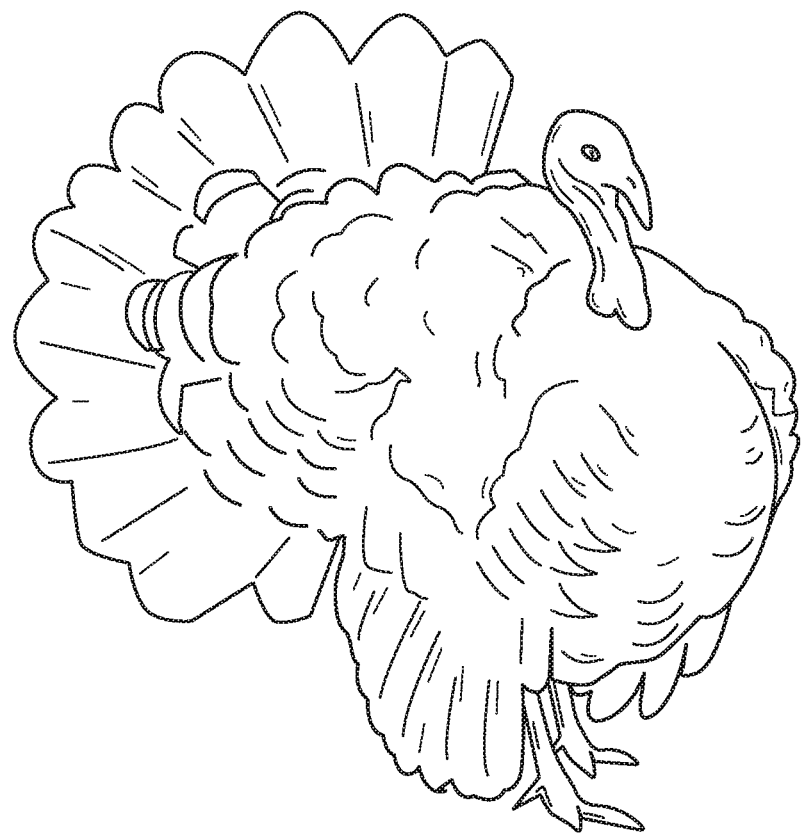
FIG. 16C is a perspective view of a representative wild game species depicting a turkey.
Figure 16D:
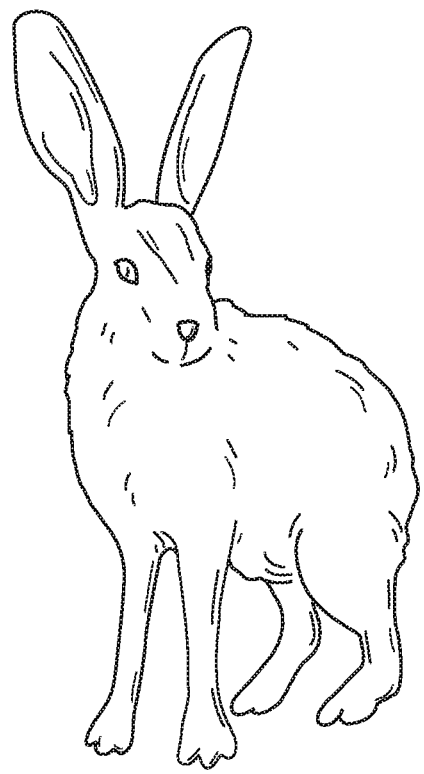
FIG. 16D is a perspective view of a representative wild game species depicting a hare.
Figure 16E:
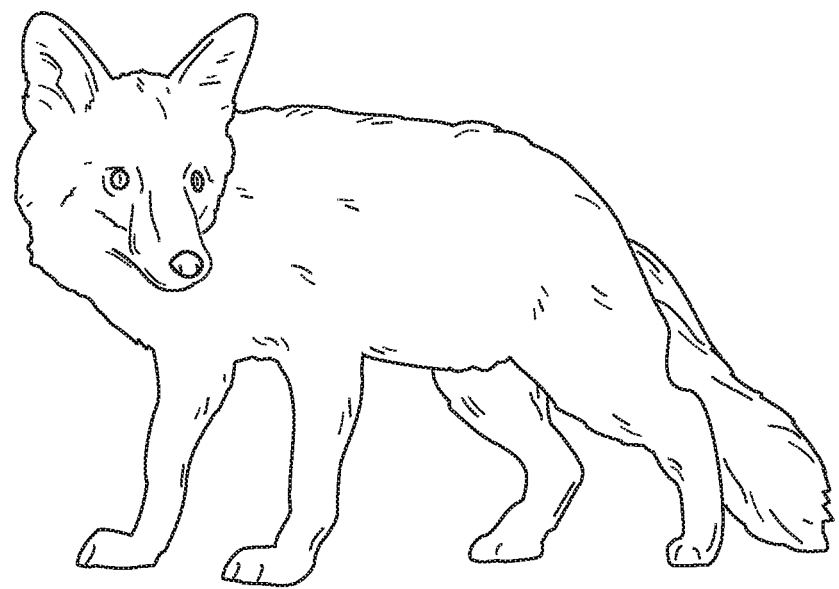
FIG. 16E is a perspective view of a representative wild game species depicting a fox.

Referring now more particularly to FIG. 15, in accordance to another embodiment of the present invention, a decoy device 120 is disclosed for placement on land or a field. The decoy device 120 is anchored to the ground G by an anchor assembly 130. The anchor assembly 130 comprises a grommet 132 extending through a hole 131 defined through the medial section 17 of blank 15, and more specifically, approximate an elongated centerline of the blank 15. The grommet 132 is fixedly seated in the hole 131 and occupies an entire diameter thereof. The grommet 132 may include an enlarged head 134 from which a cylinder 136 extends integrally downward therefrom. The cylinder 136 includes an open interior 138 for slidably receiving an upper end 144 of a stake 140, wherein the stake 140 is secured to the grommet 132 via mechanical interference. The cylinder 136 further includes an open bottom 139 in direct, open communication with the open interior 138. The stake 140 comprises an elongated body 142 having an upper end 144 opposing a sharpened lower end 146. By applying downward pressure or force to the head 134 of grommet 132 (such as via user's foot), the stake 140 is driven into the ground, or for example mud, to support the decoy device 120 in an anchored manner to the ground G. The stakes 140 are envisioned to be manufactured so as to be available in a number of various lengths to accommodate various terrains of grounds and fields where decoy device 120 will be placed. In addition, a stake 140 of considerable length allows the user to support the decoy device 120 elevationally above the ground G, as opposed to being supported contiguously with the ground G, or otherwise in substantially close contact with the ground G. The decoy device 120 provides a realistic decoy which effectively attracts other wild game, such as for example ducks, to the vicinity.

Finally, in reference to FIG. 8, in accordance to another embodiment, the present invention may comprise a combination decoy and life preserver device 10a.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

The invention claimed is:

1. A decoy device comprising:
   a lightweight, flexible panel formed or die cut into a planar decoy blank, the decoy blank is foldable into a buoyant body having a hollow interior, the blank is constructed of a flexible, closed-cell expanded foam material, the blank comprises:
   a top side;
   a bottom side, the top side and the bottom side of the blank are adorned respectively with species specific markings and colors and corresponding gender specific markings and colors representing a wild game species desired for visibly exposed representation;
   a continuous, peripheral upwardly-depending sidewall integrally joining the top side and the bottom side;
   an anterior section;
   a medial section; and
   a posterior section;
   a double-headed element;
   a means for releasably securing the double-headed element to the body; and
   a decoy stabilizer device, the decoy stabilizer device comprises a connecting link and a weight, the connecting link interconnects the weight to the decoy device thereby maintaining the decoy device in a floating, upright position on a surface of a body of water, the weight comprises a connecting eyelet, and the connecting link comprises a tether having a first end opposing a second end, wherein the first end is fastened to the connecting eyelet of the weight, the second end is passed through an oval void defined through a head portion of the double-headed element, the oval void represents an eye of the wild game species, the second end is knotted in a manner and size so as to securely fasten the second end to the head portion of the double-headed element, and wherein the head portion being positioned within the hollow interior of the body.

2. The decoy device of claim 1, wherein the body is foldable into a three-dimensional configuration representing a wild game species, the body is releasably held securely in the three-dimensional configuration via an attachment device.

3. The decoy device of claim 1, wherein the representative wild game species and respective gender thereof comprises at least one of a deer, an antelope, a coyote, a turkey, a hare, a fox, and a wild game waterfowl species.

4. A decoy device comprising:
   a lightweight, flexible panel formed or die cut into a planar decoy blank, the decoy blank is foldable into a body comprising a three-dimensional configuration representing a wild game species, the body is releasably held securely in the three-dimensional configuration via an attachment device comprising a hook-and-loop fastening system and an interengaging connection mechanism, the interengaging connection mechanism releasably secures the body in the three-dimensional configuration which is flexed;
   a double-headed element; and
   a means for releasably securing the double-headed element to the body, wherein the blank is constructed of a flexible, closed-cell expanded foam material, the blank comprises:
   a top side;
   a bottom side;
   a continuous, peripheral upwardly-depending sidewall integrally joining the top side and the bottom side;
   an anterior section, the anterior section comprises a bulbous breast portion and a pair of upper tabs, the pair of upper tabs comprising a first upper tab and a second upper tab, the breast portion is integrally formed intermediate to the pair of upper tabs, and the first upper tab and the breast portion are spaced by a first narrow V-shaped void, and the second upper tab and the breast portion are spaced by a second narrow V-shaped void;
   a medial section;
   each of the first and second upper tabs extends integrally and tapers from the medial section, adjacent the breast portion, to the anterior section; and
   a posterior section, the posterior section comprises a tail portion and a pair of lower tabs, the pair of lower tabs comprising a first lower tab and a second lower tab, the tail portion is axially aligned with the breast portion, the tail portion is integrally formed intermediate to the pair of lower tabs each of the first and second of lower tabs extends integrally and tapers from the medial section to the posterior section, and wherein the first lower tab and the tail portion are spaced by a first wide V-shaped void, and the second lower tab and the tail portion are spaced by a second wide V-shaped void, and wherein the interengaging connection mechanism comprises the first lower tab and the second lower tab, the first lower tab includes a horizontally-oriented slit, the second lower tab includes a horizontally-oriented slit, the horizontally-oriented slit of the first lower tab defines an open end facing away from the tail portion of the body, and the horizontally-oriented slit of the second lower tab defines an open end facing the tail portion of the body, the first lower tab and the second lower tab are flexibly bent towards one other and the horizontally-oriented slits of the first lower tab and the second lower tab, respectively, are axially aligned and interengaged so as to mutually engage the first lower tab and the second lower tab, thereby releasably securing the first lower tab to the second lower tab in a frictional fit arrangement.

5. The decoy device of claim 4, wherein the means for releasably securing the double-headed element to the body comprises a first tongue-and-dado joint and a second tongue-and-dado joint, the first and second tongue-and-dado joints are formed by an elongated vertically-oriented slit defined through the anterior section of the body, and wherein the double-headed element is defined as a one-piece unitary structure, the one-piece unitary structure comprises:
  a top side;
  a bottom side, the bottom side opposes the top side, each of the top side and the bottom side comprises an upper half section opposing a lower half section;
  a continuous, peripheral upwardly-depending sidewall integrally joins the top side and the bottom side; and
  a neck, the neck integrally joins the upper half sections and the lower half sections, wherein the neck comprises:
    a first horizontally-oriented slot formed integrally in the continuous, peripheral upwardly-depending sidewall; and
    a second horizontally-oriented slot formed integrally in the continuous, peripheral upwardly-depending sidewall, the second horizontally-oriented slot opposes the first horizontally-oriented slot.

6. The decoy device of claim 5, wherein each of the upper half section and the lower half section comprises:
  a head portion;
  a bill; and
  a downwardly-sloped crest, the upper half section of each of the top side and the bottom side comprises a male gender of a wild game species, the lower half section of each of the top side and the bottom side comprises a female gender of the wild game species, the upper half section of each of the top side and the bottom side is adorned with markings and colors so as to represent the wild game species of the male gender thereof, and the lower half section of each of the top side and the bottom side is adorned with markings and colors so as to represent the wild game species of the female gender thereof, the upper half section and lower half section of each of the top side and the lower side of the double-headed element correspond to and are consistent respectively with a selected species and gender side of the body selected for visibly exposed representation.

7. The decoy device of claim 6, wherein the wild game species comprises a wild game waterfowl species.

8. The decoy device of claim 5, wherein the first tongue-and-dado joint comprises a first tongue portion and a first dado portion, the first dado portion formed by the first horizontally-oriented slot of the neck, and the second tongue-and-dado joint comprises a second tongue portion and a second dado portion, the second dado portion formed by the second horizontally-oriented slot of the neck.

9. The decoy device of claim 8, wherein one end of the double-headed element is inserted through the elongated vertically-oriented slit, leaving a desired gender on an opposing end of the double-headed element visually exposed in a generally upright condition, the first tongue portion of the first tongue-and-dado joint comprises one end of the elongated vertically-oriented slit and the second tongue portion of the second tongue-and-dado joint comprises an opposing end of the elongated vertically-oriented slit, the first tongue portion of the first tongue-and-dado joint engages the first dado portion of the first tongue-and-dado joint in a sliding, friction-interferential, mating fashion, and releasably secures the first tongue portion to the first dado portion in a frictional fit arrangement, and wherein the second tongue portion of the second tongue-and-dado joint engages the second dado portion of the second tongue-and-dado joint in a sliding, friction-interferential, mating fashion, and releasably secures the second tongue portion to the second dado portion of the second tongue-and-dado joint in a frictional fit arrangement, and thus secures the double-headed element to the body of the decoy device in a releasably secured manner.

10. The decoy device of claim 4, wherein the body is defined as being buoyant and has a hollow interior, the top side and the bottom side of the blank are adorned respectively with species specific markings and colors and corresponding gender specific markings and colors representing a wild game species desired for visibly exposed representation.

11. The decoy device of claim 10, wherein the representative wild game species and respective gender thereof comprises at least one of a deer, an antelope, a coyote, a turkey, a hare, a fox, and a wild game waterfowl species.

12. The decoy device of claim 10, further comprising a decoy stabilizer device, wherein the decoy stabilizer device comprises a connecting link and a weight, the connecting link interconnects the weight to the decoy device thereby maintaining the decoy device in a floating, upright position on the surface of a body of water.

* * * * *